United States Patent
Keller

(10) Patent No.: US 10,317,184 B1
(45) Date of Patent: Jun. 11, 2019

(54) CONSTRUCTION TEMPLATE WITH LASER TARGET DEVICE AND METHOD OF USE

(71) Applicant: David M. Keller, Bradenton, FL (US)

(72) Inventor: David M. Keller, Bradenton, FL (US)

(*) Notice: Subject to any disclaimer, the term of this patent is extended or adjusted under 35 U.S.C. 154(b) by 172 days.

(21) Appl. No.: 15/620,789

(22) Filed: Jun. 12, 2017

Related U.S. Application Data

(63) Continuation-in-part of application No. 15/468,909, filed on Mar. 24, 2017.

(60) Provisional application No. 62/313,255, filed on Mar. 25, 2016.

(51) Int. Cl.
 *G01B 3/14* (2006.01)
 *G01B 11/26* (2006.01)
 *E04G 21/18* (2006.01)

(52) U.S. Cl.
 CPC .............. *G01B 3/14* (2013.01); *E04G 21/18* (2013.01); *G01B 11/26* (2013.01)

(58) Field of Classification Search
 CPC ............ G01B 3/14; G01B 11/26; E04G 21/18
 USPC .................................................... 33/286, 563
 See application file for complete search history.

(56) References Cited

U.S. PATENT DOCUMENTS

| 5,388,318 | A | 2/1995 | Petta |
| 6,360,448 | B1 | 3/2002 | Smyj |
| 7,003,890 | B2* | 2/2006 | Kavounas ........... E04F 21/1844 33/286 |
| 7,363,720 | B2 | 4/2008 | DiGavero et al. |
| 7,373,731 | B2 | 5/2008 | Nyberg |
| 7,545,517 | B2 | 6/2009 | Rueb et al. |
| 7,555,843 | B2 | 7/2009 | Leonard |
| 8,533,927 | B2 | 9/2013 | Atherton |
| 2004/0078990 | A1 | 4/2004 | Boys |
| 2005/0217129 | A1 | 10/2005 | Boys |
| 2007/0234584 | A1* | 10/2007 | Robins ..................... G01C 9/28 33/613 |
| 2008/0055554 | A1* | 3/2008 | Tubin ..................... G03B 21/26 353/30 |
| 2009/0277031 | A1 | 11/2009 | Stocking |
| 2013/0074350 | A1* | 3/2013 | Le Mer ..................... B63B 9/00 33/228 |
| 2015/0016907 | A1* | 1/2015 | Frick ..................... B23B 47/287 408/115 R |
| 2017/0350694 | A1* | 12/2017 | Rueb ..................... F16M 11/126 |

\* cited by examiner

*Primary Examiner* — George B Bennett
(74) *Attorney, Agent, or Firm* — McDonnell Boehnen Hulbert & Berghoff LLP

(57) ABSTRACT

Example systems and methods involving a construction template system are described. An example system includes a laser and a template. The laser is configured to indicate target points on a surface, such as a floor or wall of a building. Each of the target points is a predetermined location uploaded to the laser. The template includes target alignment points that correspond to the target points indicated by the laser. Furthermore, the template also includes a reference location. In examples, the reference location provides indicia of construction features as part of a building construction site. The template is adhered to the surface after aligning the target alignment points of the template with the corresponding target points.

20 Claims, 13 Drawing Sheets

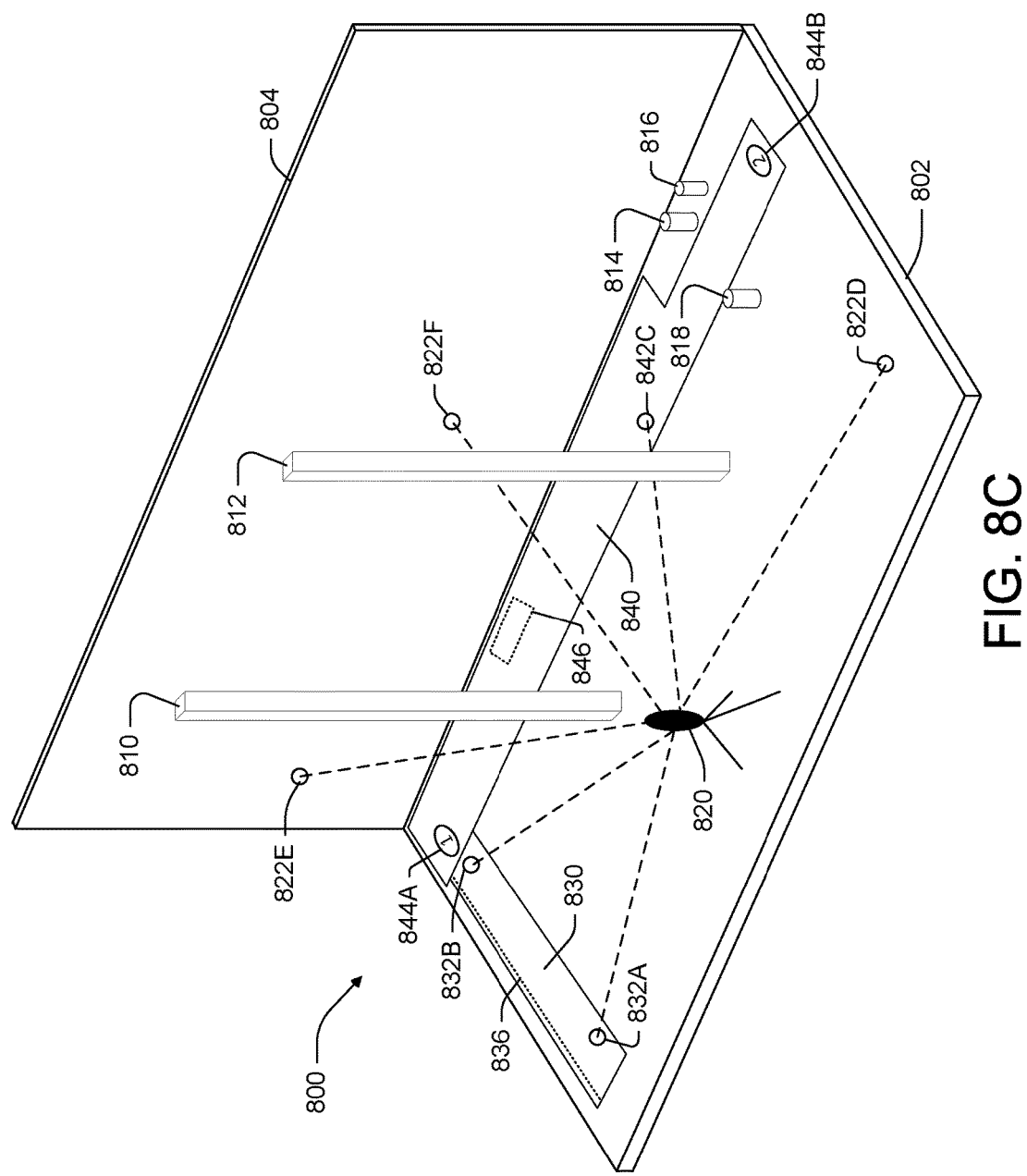

CONSTRUCTION TEMPLATE WITH LASER TARGET DEVICE AND METHOD OF USE

CROSS-REFERENCE TO RELATED APPLICATIONS

The present application is a continuation-in-part of U.S. patent application Ser. No. 15/468,909, filed Mar. 24, 2017, which claims priority to U.S. Provisional Application No. 62/313,255, filed Mar. 25, 2016. The entire contents of U.S. patent application Ser. No. 15/468,909 and U.S. Provisional Application No. 62/313,255 are herein incorporated by reference into the present application.

BACKGROUND

Field

The present application relates generally to construction template systems, and more specifically, to a template system for locating select features during construction.

Description of Related Art

Templates for residential and commercial building constructions are well known in the art and are effective means to map the location for the construction materials, e.g., an outlet, HVAC conduit, switches, and the like. In FIG. 1, a conventional process 101 includes adhering a plurality of templates 103 to a surface 105 of a building slab 107. In the illustrative embodiment, the plurality of templates includes three or more rolls 109, 111, and 113 that overlap each other and are rolled on top of the surface 105.

Although effective in most uses, the process 101 has significant disadvantages. For example, the rolling process does not work well when one or more structures 115 rigidly attach to and extend from surface 105. It should be understood that bathroom, kitchen, and other room piping, wiring, and the like could extend from surface 105, which in turn makes the process 101 difficult, if not impossible, to achieve. Further, the process 101 is time consuming, which results in added costs for labor. In addition, the process 101 requires the use of a large amount of paper for each roll, which also results in added costs for the project. Further, utilizing large rolls of templates requires expensive printing machines that are not portable, which results in added costs for the project.

Accordingly, although great strides have been made in the area of construction template processes, many shortcomings remain.

SUMMARY

In one aspect, a system is disclosed. The system includes a laser and a template. The laser is configured to indicate target points on a surface, such as a floor or wall of a building. Each of the target points is a predetermined location uploaded to the laser. The predetermined locations can be uploaded to the laser from a computing system. Moreover, the template includes target alignment points that correspond to the target points indicated by the laser. Furthermore, the template also includes a reference location. In examples, the reference location provides indicia of construction features as part of a building construction site (e.g. wall templates, wall layouts, switch plates, electrical conduit, HVAC ducting, piping, cabinets, among other construction feature examples). The template is adhered to the surface after aligning the target alignment points of the template with the corresponding target points.

In an additional example, another system is disclosed. The system includes a laser, a first layered template, and a second layered template. The laser is configured to indicate target points on a surface, such as a floor or wall. Each of the target points is a predetermined location uploaded to the laser. The first layered template includes a top-side and a bottom-side. The top-side includes target alignment points that correspond to target points indicated by the laser. The bottom-side of the first layered template includes an adhesive that is configured to couple the first layered template to the surface and a reference marking that indicates a construction feature. The reference marking on the bottom-side of the template is transferred to the surface when the first layered template is removed from the surface. The second layered template include a reference marking that also indicates a construction feature. The second layered template further includes target alignment points. The second layered template is removably adhered to the top-side of the first layered template.

In another example, a method is disclosed. The method involves indicating target points on a surface by a laser. Within examples, the target points are based on predetermined locations uploaded to the laser. The method further includes target alignment points on a first template that correspond to the target points indicated by the laser. The first template also includes a reference marking that indicates a construction feature. Additionally, the method includes adhering the first template to the surface. Finally, in one example, the method also involves transferring the reference marking of the first template to the surface.

The construction template system described herein provides an efficient way to locate one or more templates such that the installation process is more cost effective than existing systems. Additionally, by using strip templates that may be layered and/or sequenced the construction process is easier to design and plan for, as well as being easier to install in the field.

Some other advantages include aspects of the construction template system described herein such as having wall templates adhered to floor strip templates, and thus coordination issues that may otherwise arise between contractors are potentially avoided. Furthermore, templates may be all installed at the beginning of a project and thus are readily available to contractors of different trades during construction. Additionally, layering templates may help a construction team receive clear directions as a top layer(s) of a template stack are distorted or become damaged during construction. Finally, utilizing sequence marking on the templates may greatly reduce the number of target points required by the laser, which in turn may increase construction efficiency and simplify front end design efforts. Finally, printed templates described herein can sometimes print slightly off-scale and thus using the laser alignment of target points on the printed templates may serve as a double check on the accuracy of the overall construction template system.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings.

FIG. 8C illustrates a construction template system, according to an example embodiment.

Figure 1:
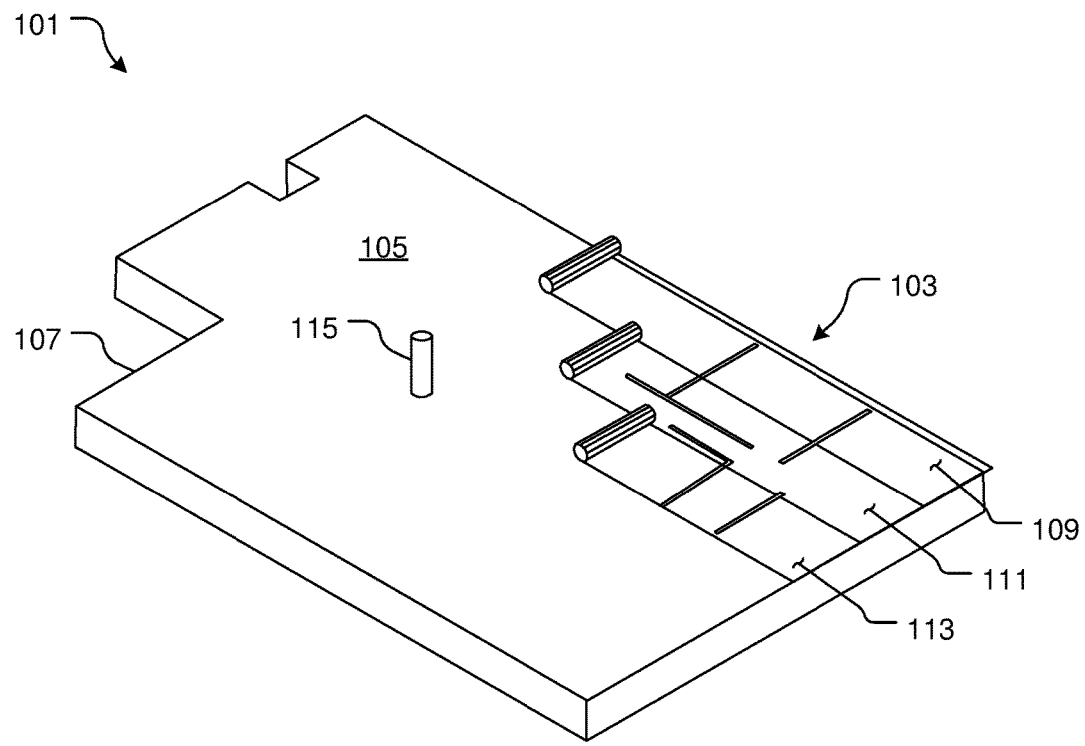
FIG. 1 is an oblique view of a conventional construction template process, according to an example embodiment.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional construction template systems. Specifically, the features in the system of the present application are located with the assistance of parts of the construction accommodating the variabilities of the construction process. The system is not time consuming and provides significant savings when utilized. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
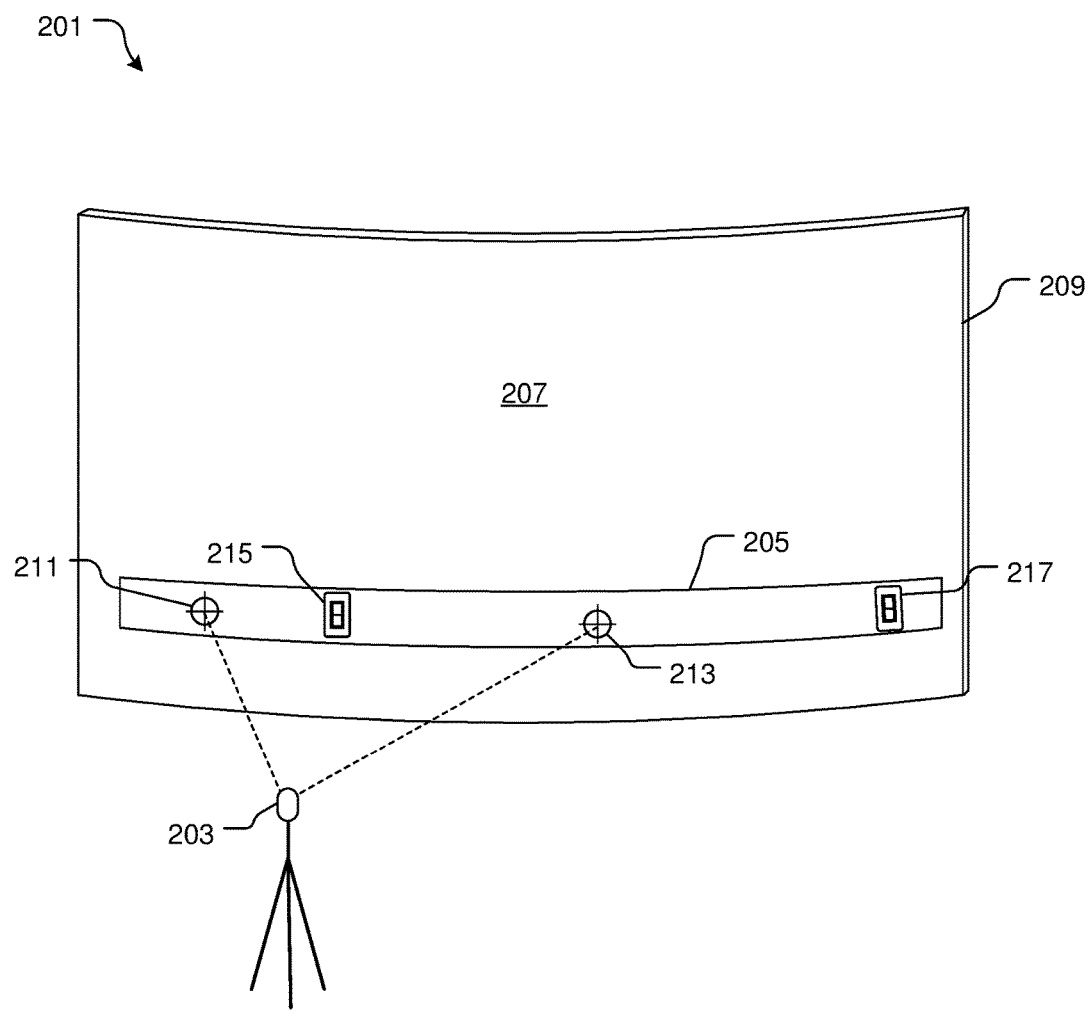
FIG. 2 is an oblique view of a template system, according to an example embodiment.

Referring now to the drawings wherein like reference characters identify corresponding or similar elements throughout the several views, FIG. 2 depicts an oblique view of the system 201 in accordance a preferred embodiment of the present application. It will be appreciated that system 201 overcomes one or more of the above-listed problems commonly associated with conventional construction template systems.

In the contemplated embodiment, system 201 includes one or more of a laser 203, configured to identify locations wherein the elongated template 205 is adhered to the surface 207 of wall 209. To achieve this feature, template 205 is provided with two or more targets 211, 213 that when illuminated indicate the exact orientation placement of the template 205. As shown, the template 205 includes one or more markings 215, 217 wherein a wall socket, switch, light, door, window, stud, electrical, HVAC components, and the like are to be placed on or within the wall 209 along with on the floor surface. During use, the worker will calibrate laser 203 and adhere the template 205 to the surface 207 after the laser 203 illuminates targets 211, 213.

Accordingly, one of the unique features believed characteristic of the present application is the use of a laser 203 with a plurality of targets 211, 213 associated with template 205 for aligning and placement of the template on the supporting structure. Further, it will be appreciated that another unique feature is the use of a single template strip of material to identify multiple locations for construction. These features greatly reduce the field labor associated with manual layout of multiple templates or elements in addition to costs associated with the construction project.

In one embodiment, the laser 203 is utilized to first mark the locations wherein the targets are to be placed, then the worker manually marks the locations and places the template thereon the marks by aligning the targets with the marks. This feature allows the worker to make location marks throughout the work area and subsequently adhere the templates on the marks; a process that greatly reduces time and costs.

In yet another embodiment, it is contemplated having a portable printer taken to the worksite, wherein the portable printer is capable of printing the templated in-situ. This feature reduces the costs of travel and provides the workers the ability to print onsite in lieu of traveling to an office or print shop offsite. This also provides the flexibility to possibly correct any errors in the printing process right there onsite in the field, and as such construction may continue where otherwise it might be halted. the place of business.

It will be appreciated that laser 203 is a smart laser capable of being preprogrammed with the target locations and capable of projecting one or more beams of light along one or more planes. These features enable the worker to locate and mark various locations simultaneously prior to adhering the templated to the target locations.

It should be understood that the target locations are typically located on the edge of the template so that the worker can align the target with the marking placed on the wall and/or floor. The targets are typically given a numbering system which in turn allows the worker to install the templates in sequence to optimize installation speed.

Figure 3:
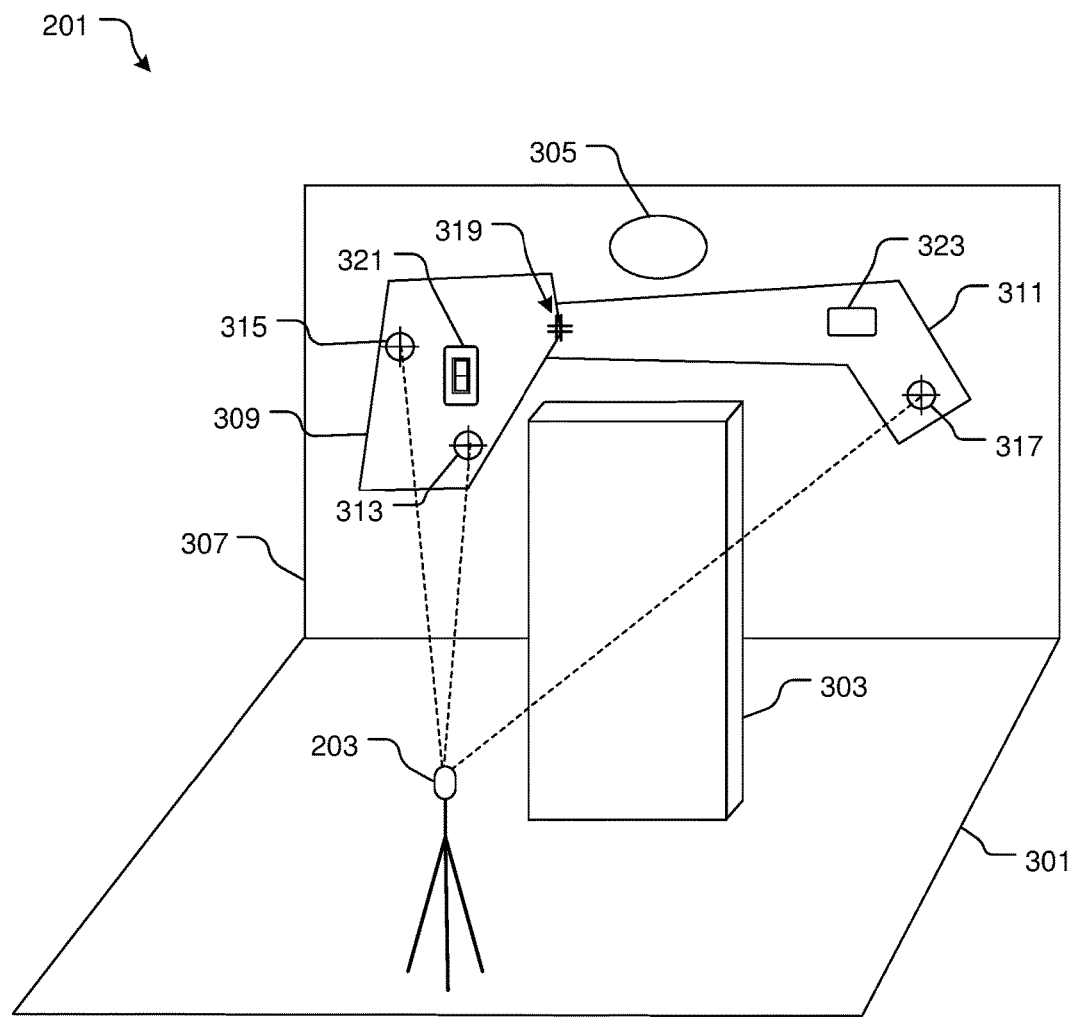
FIGS. 3-6 are oblique views of a template system, according to example embodiments.

In FIG. 3, an alternative embodiment of system 201 is shown. It should be understood that the system could utilize two or more templates joined together to achieve the desired results of identifying one or more locations for manufacture. In the exemplary embodiment, laser 203 is stationary on floor 301 and a first obstacle 303 extends from floor 301 and partially blocks the beam of light from laser 203. A second obstacle 305 is positioned on wall 307 and restricts placement of the templates.

To maneuver around the obstacles 303, 305 for identifying locations for manufacture, it is contemplated utilizing two templates 309, 311 on wall 307 that are oriented in position via targets 313, 315, and 317 along with using an alignment marking 319 partially printed on each template. After the targets are illuminated by laser 203 and the marking 319 is aligned, the locations for construction or manufacturing, e.g., locations 321, 323 are placed in the correct position.

Figure 4:
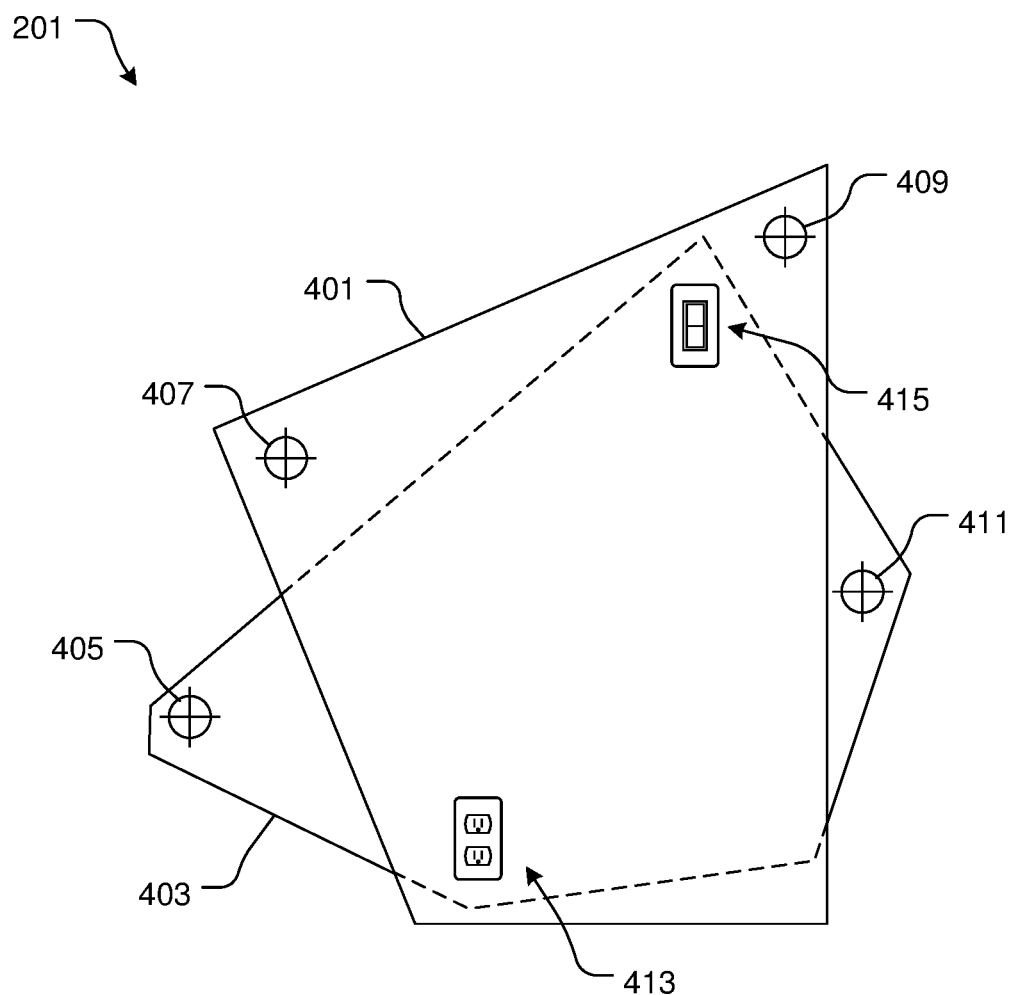

In FIG. 4, an alternative embodiment of system 201 illustrates the feature of securing two or more templates 401, 403 on top of each other. The embodiment includes the features of utilizing a plurality of targets 405, 407, 409, and 411 for aligning the templates relative to each other and for identifying the locations for manufacture, e.g., locations 413, 415. These features allow the worker to remove template 401 from 403 after use.

Figure 5:
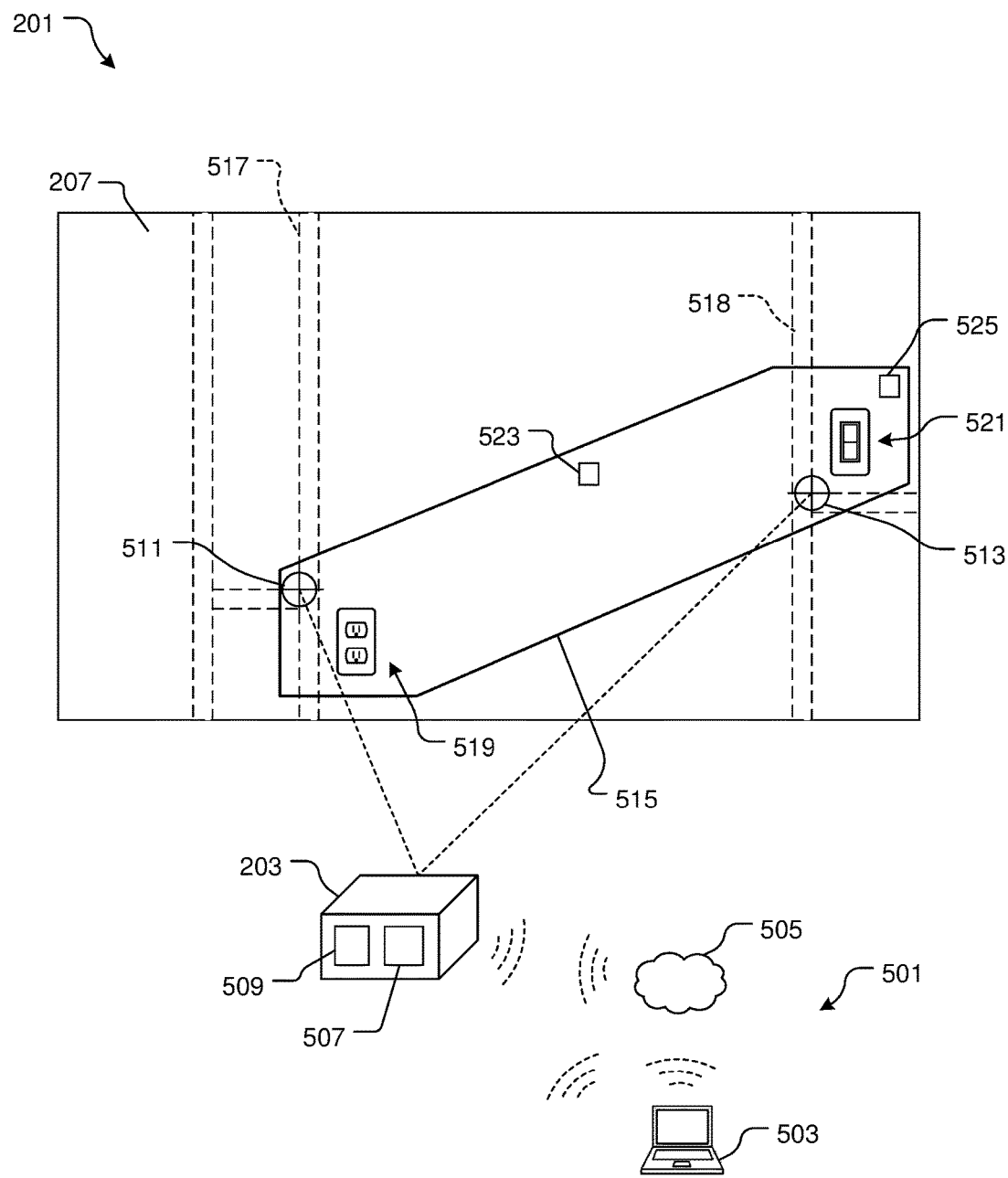

In FIG. 5, an alternative embodiment of system 201 illustrates a communication assembly 501 operably associated with laser 203. The assembly 501 includes a computer 503 in communication directly with a receiver 507 of laser 203 and/or through a server 505. During use, the data to be transmitted to laser 203 could be stored within a database 509 carried by or in communication with laser 203.

The system 201 could be adapted to identify locations such as studs 517, 518 disposed within the wall and the targets 511, 513 relative to the locations. It will be appreciated that the template 515 could also include cutouts 523, 525 that can easily be removed during the manufacturing process along with the location markers 519, 521.

Figure 6:
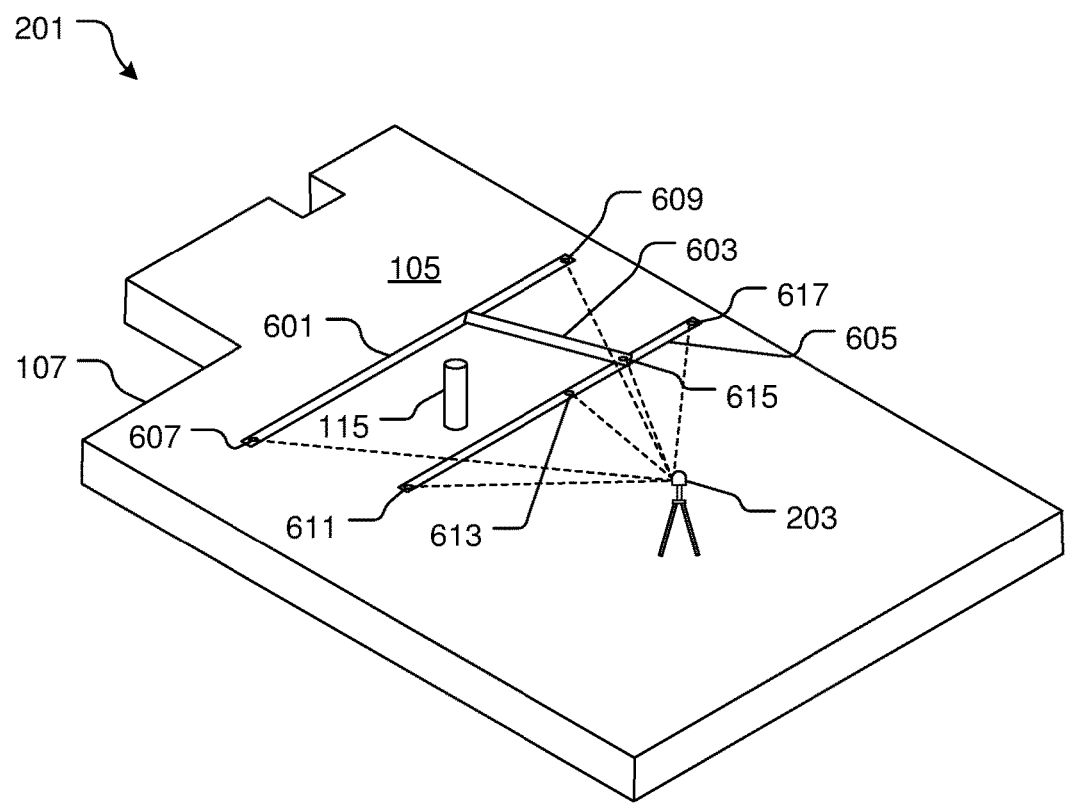

As shown in FIG. 6, the system 201 could also be utilized with the floor 107. In the exemplary embodiment, the laser 203 is operably associated with three templates 601, 603, and 605 by illuminated targets 607, 609, 611, 613, 615, and 617. Accordingly, it will be appreciated that a plurality of templates could be utilized on the walls and/or floor of the building for manufacture.

Figure 7:
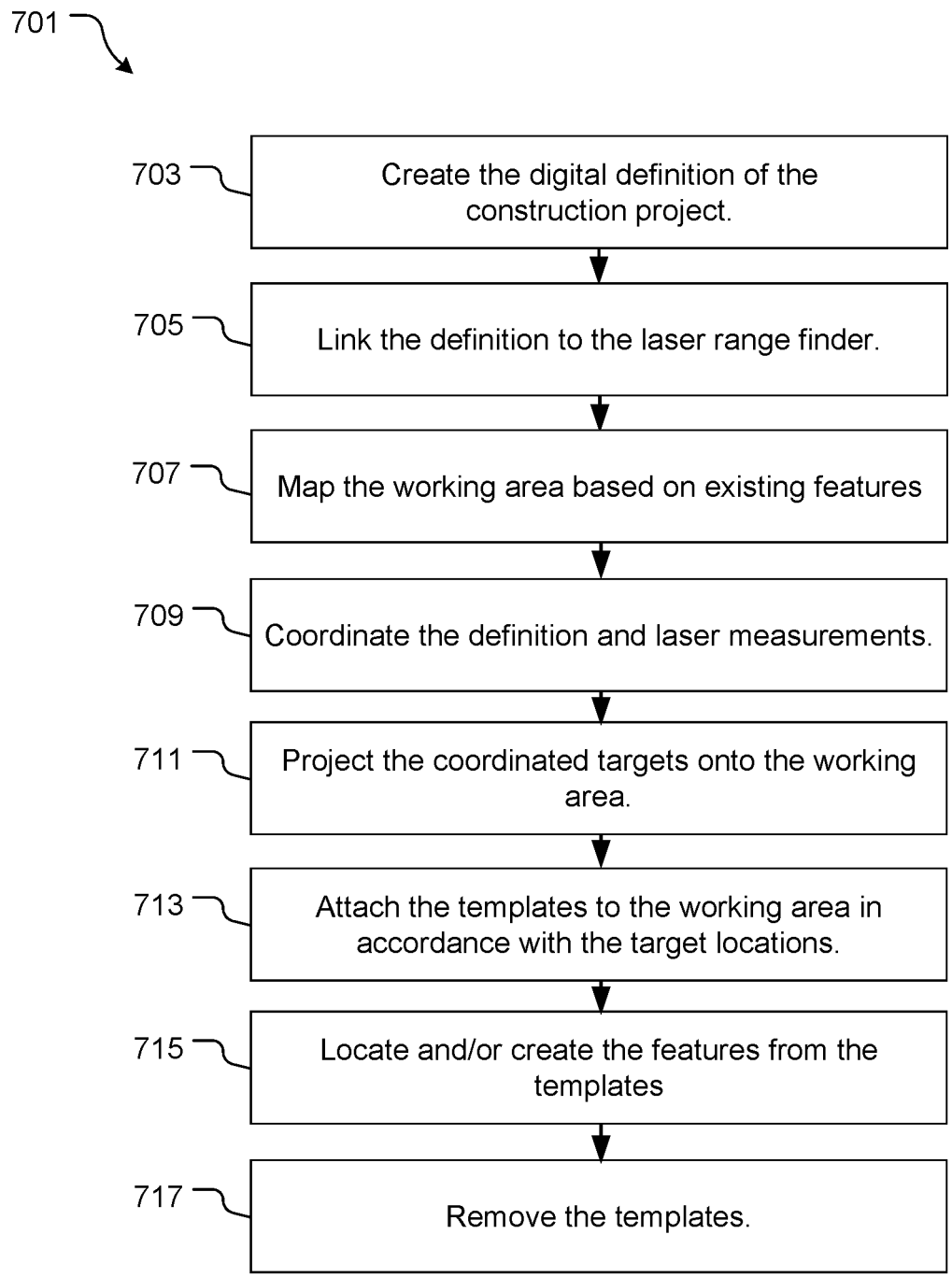
FIG. 7 is a simplified flowchart depicting a method of use.

Referring now to FIG. 7, a flowchart 701 depicts a method of use, which includes creating a digital definition of the construction project 703, linking the digital definition to laser range finder 705, mapping the working area from existing features 707, coordinate the digital definition to the laser measurements 709, projecting coordinated targets onto the working area 711, attaching templates to the area 713, locating/creating features on from the templates 715, removing templates 717.

Example Construction Template Systems and Methods

FIGS. 8A-8E illustrate scenes with embodiments of a construction template system 800. As depicted, a laser 820 may be located within a construction site, for example a building construction site. The construction site may include a floor 802, a wall 804, a first obstacle 810, a second obstacle 812, a third obstacle 814, a fourth obstacle 816, and a fifth obstacle 818, among other aspects. The construction template system 800 may include the laser 820, a first template 830, a second template 840, a third template 850, and a fourth template 860. The elements and features of the construction template system 800 may be the same or similar to the elements and features of the template system described in FIGS. 2-7. For example, the first template 830 (and other templates of FIGS. 8A-8E) may be similar to the elongated template 205 of FIG. 2, templates 309 and 311 of FIG. 3, templates 401 and 403 of FIG. 4, template 515 of FIG. 5, and templates 601, 603, and 605 of FIG. 6. The templates described may also be considered or described as layout templates or strip templates.

Figure 8A:
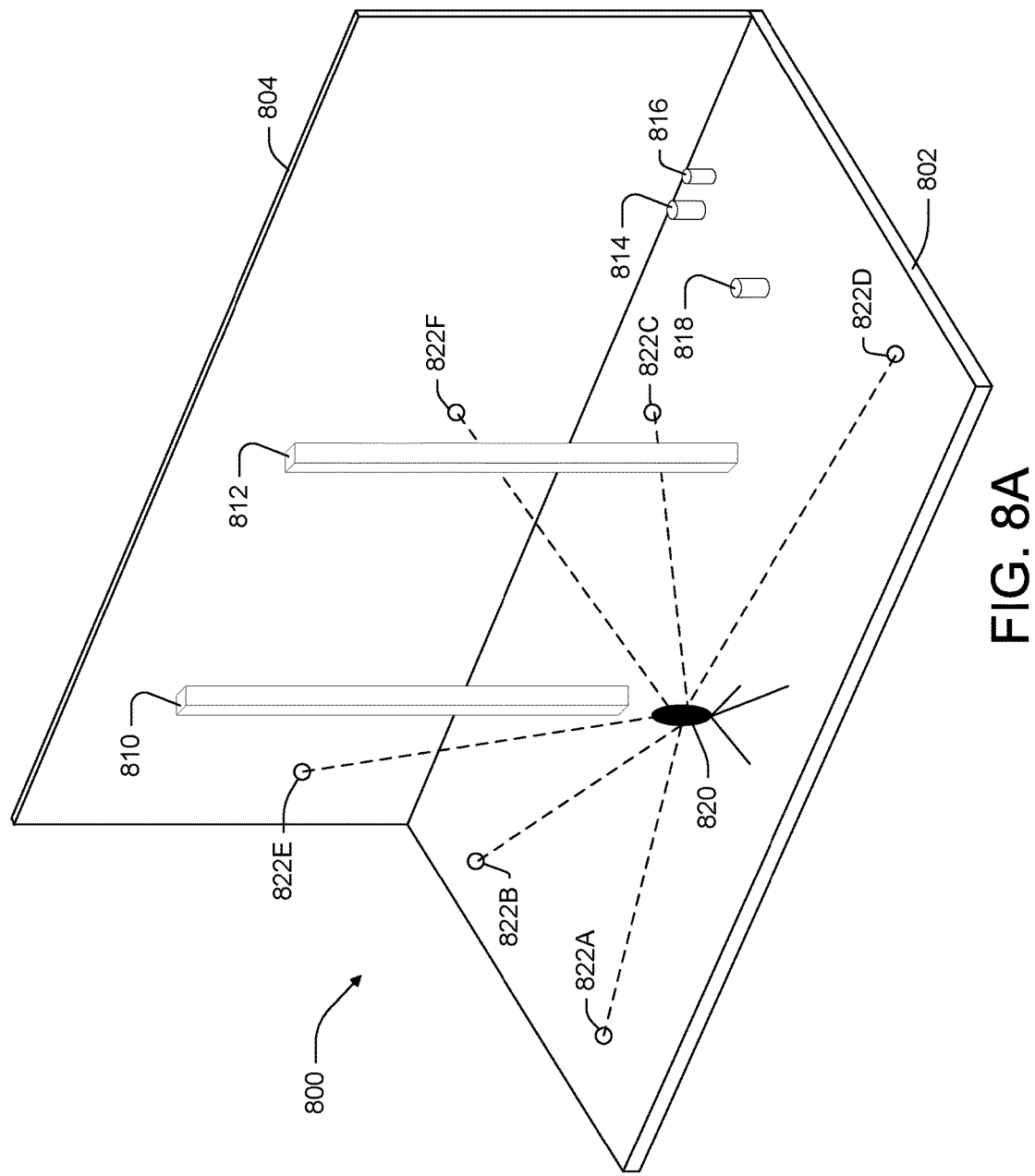
FIG. 8A illustrates a construction template system, according to an example embodiment.

As shown in FIG. 8A, the laser 820 may indicate a plurality of target points 822A-822F on one or more surfaces, such as the floor 802 and/or the wall 804. The laser 820 may be considered a robotic laser used during a construction process. In further examples, the laser 820 may indicate the plurality of target points 822A-822F on other surfaces, such as a ceiling or more than one wall, among other possibilities. Indicating the plurality of target points 822A-822F may include illuminating the plurality of target points 822A-822F or otherwise providing notice to an individual of locations of the plurality of target points 822A-822F. The plurality of target points 822A-822F may represent locations marked by the laser for corresponding marks or references that may be printed on a template (such as the first template 830, the second template 840, the third template 850, or the fourth template 860) in order to properly locate the template. Further details about the templates considered are described below.

A computer system (for example, the computer 503 of FIG. 5, or another computer system) may be used to upload a plurality of predetermined locations for the plurality of target points 822A-822F. In some examples, a project data file may be loaded to the laser 820. The predetermined locations may be based on blueprints, plans, or other construction drawings and documents that identify a construction plan for the construction of a building. Such plans may include reference locations for construction features such as piping, ductwork, wall layouts, wall features, floor layouts, floor features, supporting structures, and other physical construction features among other examples.

In some embodiments, a different location indicating device may be used instead of, or in coordination with, the laser 820. For example, the laser 820 may instead be a GPS (Global Positioning System) device or other location indicating device that may indicate the plurality of target points 822A-822F on a surface such as the floor 802 and/or the wall 804. Within other examples, the location indicating device may use Bluetooth®, Wi-Fi (e.g., an IEEE 802.11 protocol), Long-Term Evolution (LTE), WiMAX (e.g., an IEEE 802.16 standard), a radio-frequency ID (RFID) protocol, near-field communication (NFC), electromagnetic and/or other protocols to indicate the plurality of target points 822A-822F. Moreover, such protocols may also be used to upload the plurality of predetermined locations to the location indicating device. Furthermore, in some instances, more than one location indicating device may be used. Thus, while FIGS. 8A-8E provide the laser 820 as the location indicating device, other related technologies to indicate the plurality of target points are considered herein.

Within examples, the laser 820 may be set up on the floor 802 of a construction site, be configured to align itself with a current position within the construction site, and then based on the predetermined locations uploaded to the laser 820, indicate the target points 822A-822F on the surface. In some further examples, a worker or installer may mark and sequentially number one or more of the plurality of target points 822A-822F.

Figure 8B:
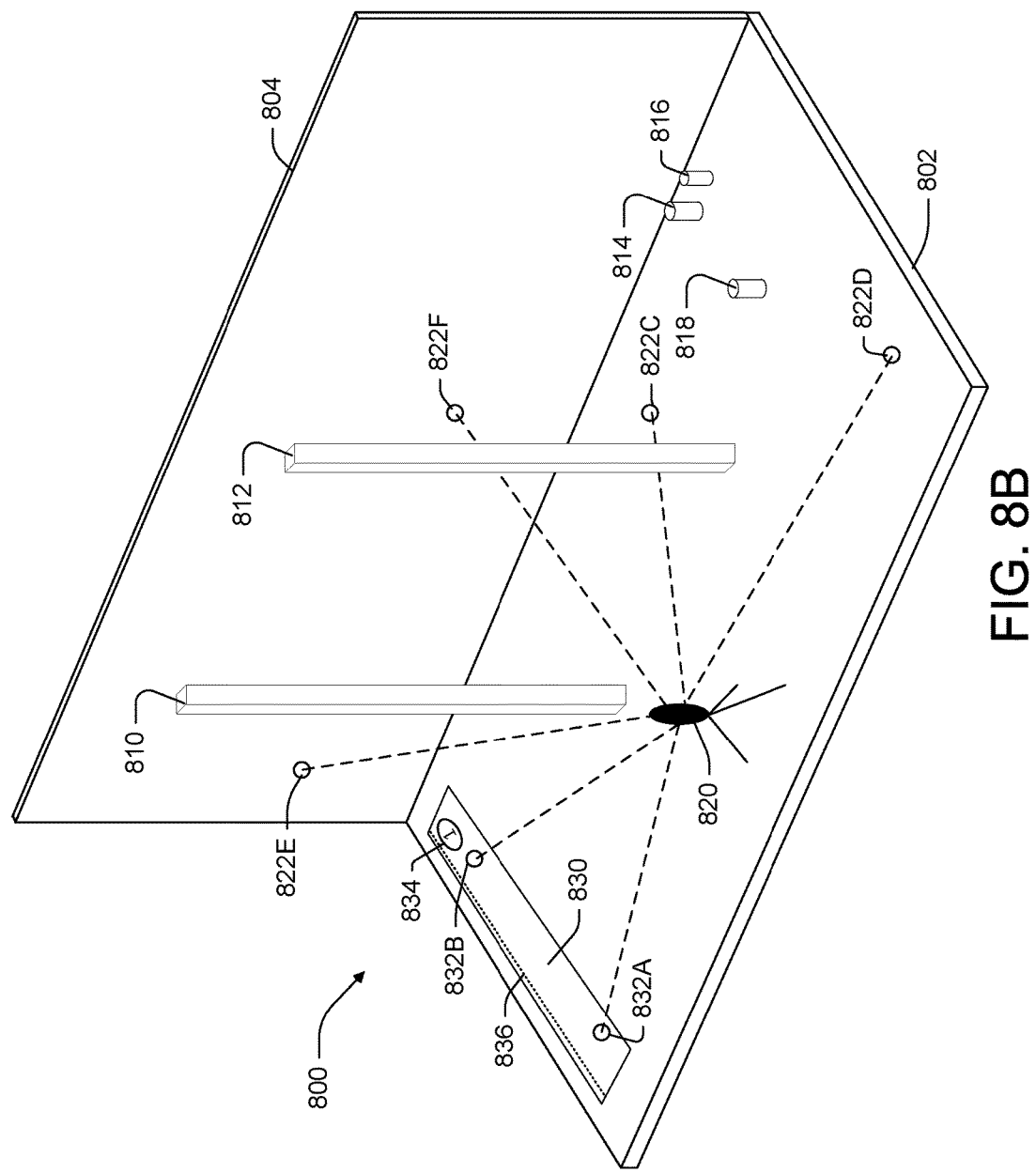
FIG. 8B illustrates a construction template system, according to an example embodiment.

As shown in FIG. 8B, at least a portion of the first template 830 may be adhered to a surface, such as the floor 802. The first template may include a plurality of target alignment points 832A-832B, a template alignment point 834, and a reference marking 836. Each of the target alignment points 832A-832B correspond to one of the plurality of target points 822A-822F. For example, as depicted in FIG. 8B, the target alignment point 832A may correspond to the target point 822A (see FIG. 8A). As such, within the example depicted in FIG. 8B, by aligning the target alignment point 832A with the target point 822A and the target alignment point 832B with the target point 822B, the first template 830 may be properly aligned on the floor 802 of the construction site.

The plurality of target alignment points 832A-832B may be printed on the first template 830 and include a shape or a design that aligns with a corresponding target point indicated by the laser. In some aspects, the first template 830 may be transparent or partially transparent such that an installer may align, for example, the target alignment point 832B with the target point 822B by overlaying the first template 830 over the floor 802 where the laser 820 continues to indicate the target point 822B or an installer has marked the target point 822B. In other aspects, the first template 830 may be opaque or nearly opaque, among other possibilities.

As described above, the first template 830 further includes the template alignment point 834. The template alignment point 834 may be printed on the first template 830 such that another template, such as the second template 840 (see FIG. 8C) may be aligned with the first template 820. In some examples, although not as depicted in FIG. 8B, the template alignment point 834 may also be one of the plurality of target alignment points 832A-832B. Additionally, the template alignment point 834 may include a sequence marking, such as depicted in FIG. 8B with the marking "1." In other examples, other markings, such as one or more of the target alignment points 832A-832B may include sequence marking. The sequence marking may indicate to an installer which template to install first, as well as other alignment and construction information, as described in further detail below.

The reference marking 836 may be similar to the locations 215 and 217 of FIG. 2, the locations of manufacturing 321 and 323 of FIG. 3, or the location of manufacturing 413 and 415 of FIG. 4, and location markers 519, 521, and cutouts 523, 525 of FIG. 5. The reference marking 836 may be printed or otherwise included as part of the first template 830 and provide location markings for physical construction features that are to be located or installed on the surface that the first template 830 is installed on. For example, wall layouts, switch plates, electrical conduit, HVAC ducting, piping, cabinets, or other construction features may be marked on the first template 830 by the reference marking 836. In some examples, the first template 830 may include the reference marking 836 of a specific type of construction trade, for example just plumbing reference markings. In such an embodiment, other templates, installed with, on top of, alongside, or in another related manner, may include reference marking for another construction trade, such as electrical or mechanical (including HVAC).

As illustrated, at least a portion of the first template 830 may be adhered to a surface, such as the floor 802. In such an example, a glue machine or applicator may provide an adhesive layer of glue or other material such that the first template 830 may be adhered or stuck to the floor 802. Within examples, the first template 830 may be removably adhered to the floor 802 such that a worker may be able to peel away the first template 830 from the floor 802.

In some examples, the first template 830 may further include a perforated portion (not shown in FIGS. 8A-8E) and the perforated portion of the first template 830 may be removed (e.g., torn away from) a remaining portion of the first template 830. The remaining portion of the first template 830 may remain adhered to the surface, while the perforated portion of the first template 830 may include and/or be used as a wall template.

The construction template system 800 may also include the use of layered templates. For example, the first template 830 may be considered a first layered template that includes a top-side and a bottom-side. The top-side may include a first reference marking (e.g. the reference marking 836) and a plurality of target alignment points (e.g., the target alignment points 832A-832B). The bottom-side may include the adhesive that is configured to removably couple the first layered template to the surface (such as the floor 802 or wall 804) as well as the first reference marking in a transferrable ink or other marking. In such an example, a second layered template may be adhered to the top-side of the first layered template. The second layered template may include the same markings as the first layered template, or in some instances, difference sets of reference and/or alignment markings. In at least one example, the second layered template may be same or nearly the same as the first layered template and the first and second layered templates may be overlaid one another.

As such, if the second layered template becomes distorted, torn, or otherwise damaged during construction, the second layered template may be removed from the first layered template. In some examples, more layered templates may be overlaid, adhered, and/or stacked together. Templates may include various indicia including reference markings and/or sequence markings based on trade and/or sequencing of the construction. For example, plumbers may use reference markings on the second layered template for some aspect of the installation of piping. Then, they may remove the second layered template and thus reveal difference reference markings in the same or nearby locations for another trade, such as the carpenters. In some examples, the carpenters may then remove the first layered template. Reference markings of the first layered template adhered to the surface may be transferred to the surface so that the carpenters can then use the reference markings for wall locations, among other examples. This is just an example of the layered templates and a variety of layered template sequences and markings based on the construction process and various trade contractors is considered herein.

Continuing with FIG. 8C, the second template 840 is installed by aligning the at least one target alignment point 842C with the corresponding target point 822C (see FIGS. 8A-8B) and a template alignment point 844A with the template alignment point 834 of the first template (see FIG. 8B). As such, at least a portion of the second template 840 overlays a portion of the first template 830, and more particularly, the portion of the first template 830 that includes the template alignment point 834. The second template 840 may also include another template alignment point 844B that may be configured to align yet another template (such as the third template 450).

As such, in this example, with the use of the template alignment point 844A, the second template 840 may be properly aligned on the floor 802 by the single target point 822C and corresponding target alignment point 842C. Thus, the planning, aligning, and installation processes may be simplified and made more efficient. The second template 840 may further include a plurality of reference markings 846 that may be similar to the reference marking 836 of the first template 830. Furthermore, the shape of the second template 840 may be different than the shape of the first template 830. For example, as illustrated in FIG. 8C, the second template 840 may be shaped and/or cut to easily fit around objects that would otherwise interfere with the template construction process, such as the third obstacle 814 and fourth obstacle 816 (among other possible obstacles/interferences).

As shown in FIG. 8C, by utilizing the laser 820 alignment and indication of the plurality of target points 822A-822F, along with the use of the first template 830 and the second template 840, obstacles may be easily designed around during the construction layout process and by sequencing the multiple strip templates the process may require less coordination and measurement and make the installation process much quicker and more efficient.

Figure 8D:
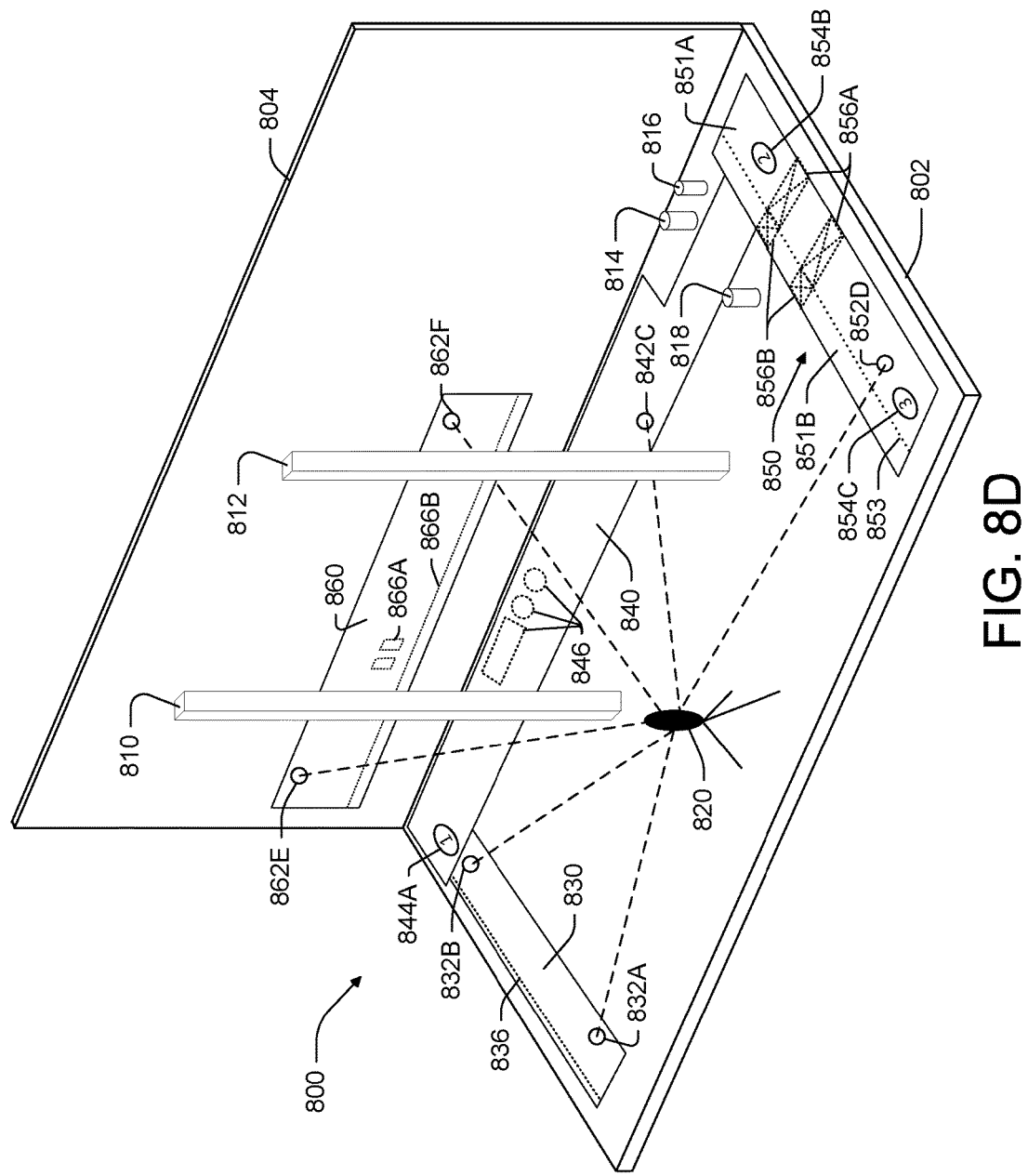
FIG. 8D illustrates a construction template system, according to an example embodiment.

Similar to adding the second template in FIG. 8C, FIG. 8D illustrates the installation of the third template 850 on the floor 802. The third template 850 may include a first portion 851A of the template 850 and a perforated portion 851B of the template 850. A template perforation 853 may span a portion of the third template 850 such that the perforated portion 851B may be removed just leaving the first portion 851A of the template 850 adhered to the floor 802. As such, in examples, the perforated portion 851B may not be adhered to the floor 802.

The first portion 851A and the perforated portion 851B of the third template 850 may include a first plurality of reference markings 856A and a second plurality of reference markings 856B respectively. The first plurality of reference markings 856A and the second plurality of reference markings 856B may correspond to each other. For example, the first plurality of reference markings 856A may indicate locations or construction features of a framed wall and the second plurality of reference markings 856B may indicate locations or construction features of a top and bottom plate of a framed wall, for example. The first and second pluralities of reference markings 856A-856B may correlate to one another, for example, may be spaced apart a same distance, or have some other physical characteristic. In examples, when the perforated portion of the template 851B is detached along the perforation 853, a relationship between the second plurality of reference markings 856B is maintained and may be similar to a relationship between the first plurality of reference markings 856A that remains adhered to the floor. Thus, a worker may be able to remove the perforated portion of the template 851B and use that as a basis for the framed wall spacing without needing to measure a spacing between the first plurality of reference markings 856A, saving time and reducing a chance of error.

The third template 850 further includes a target alignment point 852D (corresponding to the target point 822D—see FIG. 8C), a template alignment point 854B (corresponding to the other template alignment point 844B of the second template 840—see FIG. 8C), and another template alignment point 854C.

FIG. 8D also includes the fourth template 860 that is adhered to the wall 804. The fourth template 860 includes a plurality of target alignment points 862E and 862F (corresponding to the target points 822E and 822F respectively—see FIG. 8C) and another plurality of reference markings 866A-866B. Utilizing the laser 820 and the fourth template 860 on the wall 804 is an additional example of how the construction template system 800 is able to accurately and precisely locate a template on a surface despite potential obstacles, such as the first obstacle 810 and the second obstacle 812.

Figure 8E:
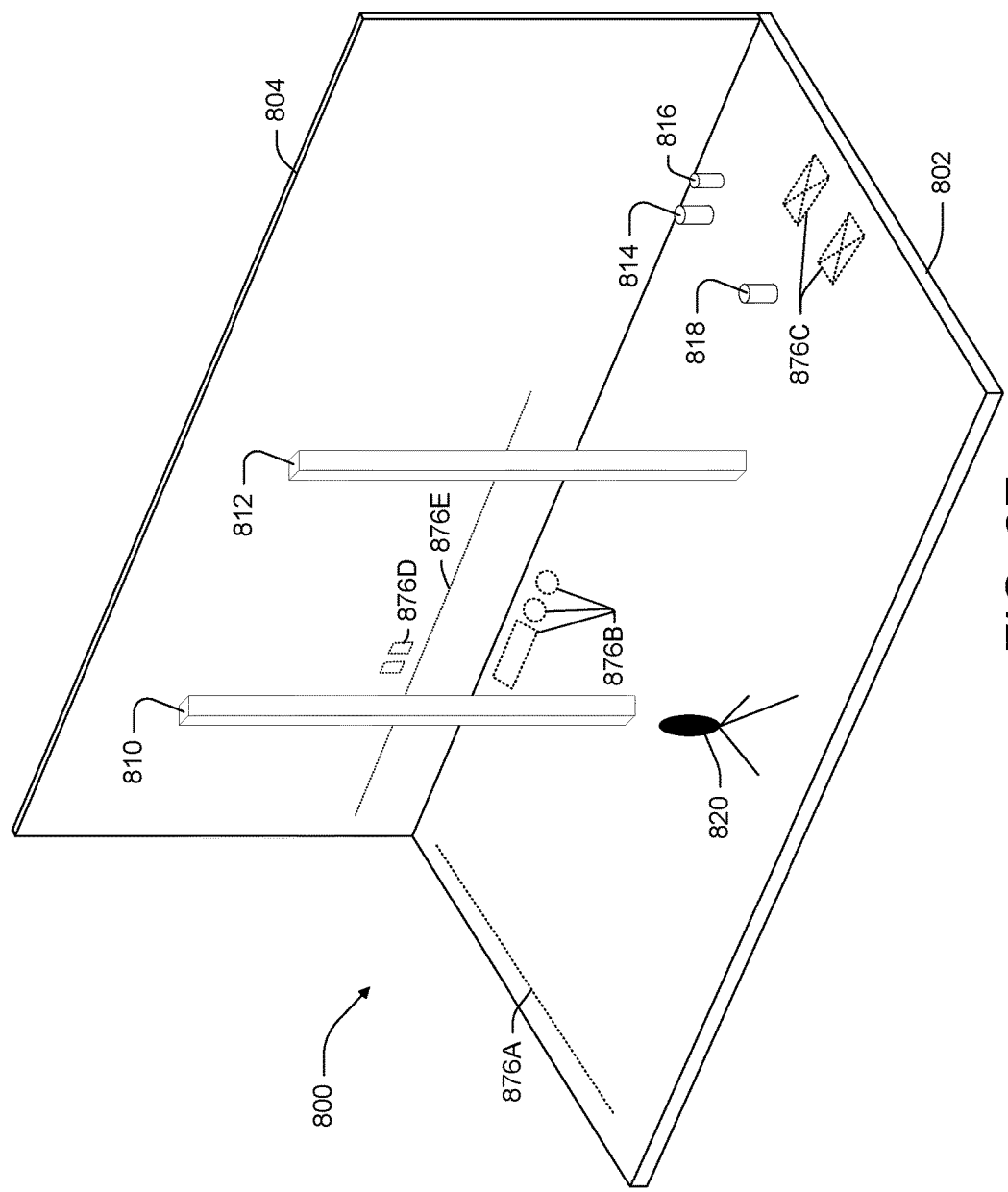
FIG. 8E illustrates a construction template system, according to an example embodiment.

FIG. 8E illustrates the floor 802 and the wall 804 of the construction site after the first template 830, the second template 840, the third template 850, and the fourth template 860 have been removed. The corresponding reference markings for each of the templates of FIGS. 8B-8D may include a transferrable ink on a bottom-side of each template that may be transferred to the respective surface when the template is removed. Thus, the floor 802 and/or the wall 804 may now have a first reference marking 876 from the first template 830, a plurality of second reference markings 876B from the second template 840, a plurality of third reference markings 876C from the first portion of the template 851A of the third template 850 (notably, no corresponding reference markings from the second plurality of reference markings 856B of the perforated portion 851B that may have been removed and not adhered to the floor 802), and finally, a plurality of reference markings 876D and 876E from the fourth template 860. The workers now have the ability to build on or within the surfaces of the floor 802 and/or the wall 804 using the reference markings left behind from the templates, without needing to build on top of the templates.

For example, the reference markings 876A-876E are left behind and flooring materials may be laid out without any templates interfering with the floor materials. Furthermore, the templates may be sequentially removed such that portions of the surface, such as the floor 802, may be available for flooring materials to be installed. For example, flooring near the reference markings 876C may be installed after only removing the third template 850. The other templates, e.g. the fourth template 860, the second template 840, and the first template 830, may remain in place without interfering. Thus, construction crews and trades may be even more coordinated and have more flexibility than when compared to other systems.

Figure 9:
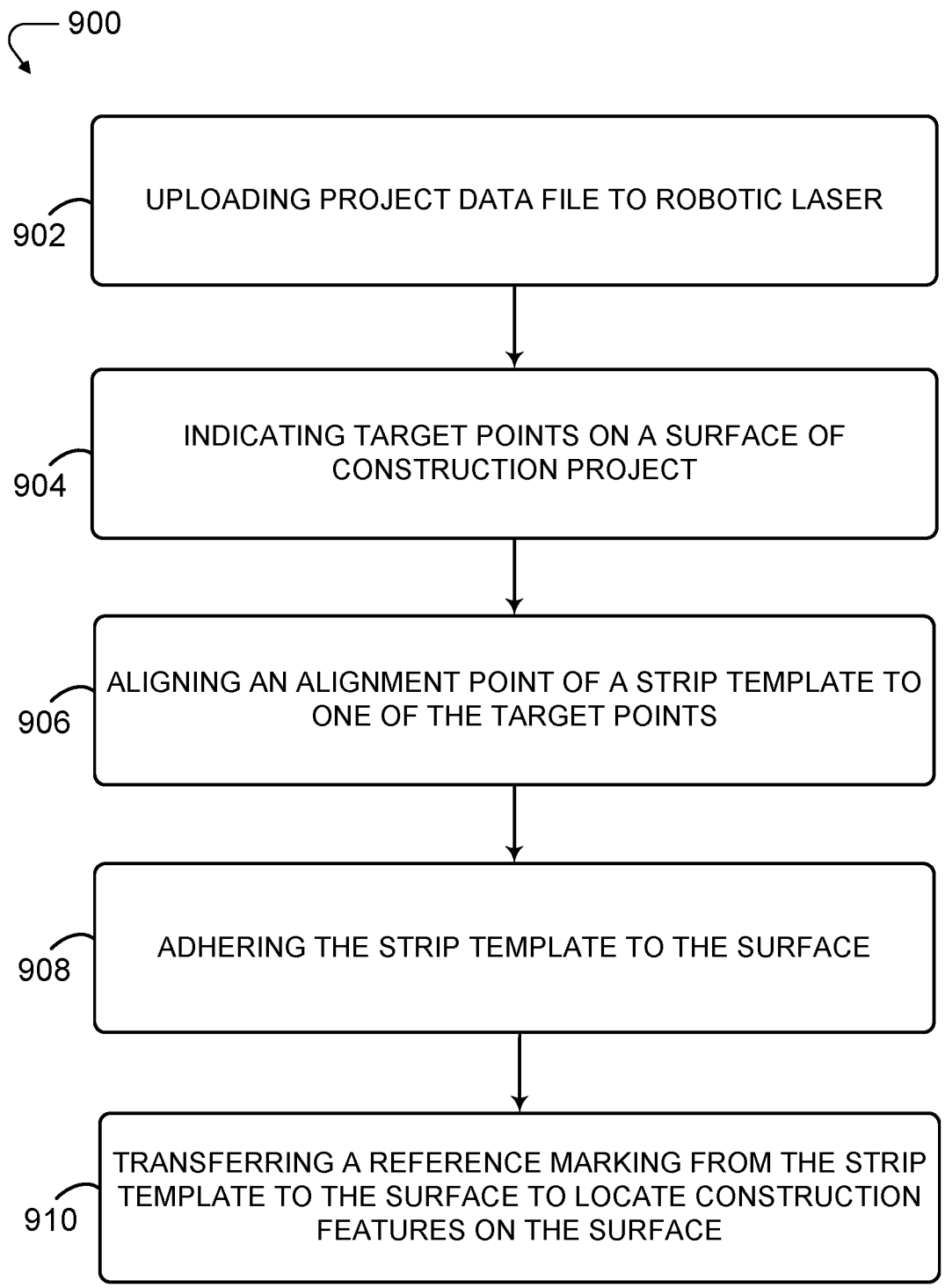
FIG. 9 is a flow chart illustrating a method, according to an example embodiment.

FIG. 9 is a flow chart illustrating a method 900 utilizing a construction template system, according to an example embodiment. The method 900 may include one or more operations, functions, or actions as illustrated by one or more blocks 902-910. Although the blocks are illustrated in a sequential order, these blocks may in some instances be performed in parallel. Also, the various blocks may be combined into fewer blocks, divided into additional blocks, and/or removed based upon the desired implementation.

Illustrative methods, such as method 900, may be carried out in whole or in part by a component or components of a construction template system. For simplicity, method 900 may be described generally as being carried out by a construction template system, such as the construction template system 800. However, it should be understood that example methods, such as method 900, may be carried out by other entities or combinations of entities without departing from the scope of this disclosure At block 902, the method 900 involves uploading a project data file to a robotic laser. The project data file may include a plurality of target points that may be used to align templates during the construction process. As such, the project data file may include drawings, descriptions, and other information about a construction site and project. The laser may include GPS, communication systems, power systems, and other components.

At block 904, the method 900 involves indicating a plurality of target points on a surface by the laser. The surface may be a wall, a floor, a ceiling, or other surface that is part of a construction site or building project. Indicating the plurality of target points may include the laser illuminating specific points on the surface by a shape or other indication such that an installer may recognize the mark as target point to align a template. Each of the plurality of target points may be sequenced and/or include other identifying indicia provided by the laser to help the construction template alignment process.

At block 906, the method 900 further involves aligning a target alignment point (or "alignment point") printed or otherwise included on a strip template to one of the plurality of target points indicated by the laser. The strip template may be transparent or partially transparent to allow an installer to see through and align markings of the template with the target points indicated by the laser or other markings on the surface. The template may further include a reference marking that indicates a construction feature (e.g. a wall plate, a switch plate, a door, a window, a stud, an electrical component, a piping component, or a heating, ventilation, and air conditioning component, among other examples). Moreover, the template may include a template alignment point configured to align with another template alignment point of another template, for example. Finally, the template may also include a sequence marking for sequencing the installation of the template with other templates at the construction site.

At block 908, the method 900 involves adhering at least a portion of the strip template to the surface. After any markings are printed on the template, such as the reference marking or alignment point(s), the strip template may be put through a glue machine (or similar) to apply an adhesive to at least one side of the strip template.

At block 910, the method 900 also involves transferring a reference marking from the strip template to the surface in order to locate one or more construction features on the surface. Transferring the reference marking to the surface may include removing the strip template from the surface such that a transferrable ink is left on the surface indicating the reference marking.

In further embodiments, the method 900 may include additional aspects, such as adhering a second template to the top-side of the first template to create layered templates that may include the same or different reference and other markings.

While various aspects of the disclosure have been disclosed herein, other aspects and embodiments will be apparent to those skilled in the art. Accordingly, the embodiments disclosed herein are for purposes of illustration, and are not intended to be limiting, with the true scope of the disclosure being indicated by the following claims.

What is claimed is:

1. A system, comprising:
    a laser configured to indicate a plurality of target points on a surface, wherein each of the plurality of target points is one of a plurality of predetermined locations uploaded to the laser; and
    a first template comprising:
        a plurality of target alignment points, wherein each target alignment point corresponds to one of the plurality of target points; and
        a reference location marking;
    wherein at least a portion of the first template is adhered to the surface after aligning each of the target alignment points of the first template to each of the corresponding target points indicated by the laser.

2. The system of claim 1, wherein the first template further comprises a template alignment point, and the system further comprises:
    a second template, the second template comprising:
        at least one target alignment point that corresponds to one of the plurality of target points;
        a second template alignment point that corresponds to and is configure to align with the template alignment point of the first template; and
        a second reference location marking;
    wherein the second template is adhered to the surface after (i) aligning the at least one target alignment point of the second template with one corresponding target point indicated by the laser and (ii) aligning the second template alignment point with the corresponding template alignment point of the first template.

3. The system of claim 2, wherein at least a portion of the second template is adhered to a portion of the first template such that the first template and the second template overlap, and further wherein the overlapping portion of the first template and the second template includes the template alignment point of the first template and the second template alignment point.

4. The system of claim 2, wherein the template alignment point is also one of the target alignment points.

5. The system of claim 1, wherein the reference location marking comprises a marking for at least one of a wall plate, a switch plate, a door, a window, a stud, an electrical component, a piping component, or a heating, ventilation, air conditioning component, or other building component.

6. The system of claim 1, wherein the first template includes a perforated portion such that the perforated portion may be removed from a remaining portion of the first template that remains adhered to the surface.

7. The system of claim 6, wherein the removed perforated portion of the first template includes a wall template.

8. The system of claim 2, wherein the first template further comprises a first sequence marking and the second template further comprises a second sequence marking, wherein the second sequence marking indicates that the second template is to be adhered after the first template.

9. The system of claim 8, wherein the target point indicated by the laser that corresponds to one of the target alignment points of the first template comprises the first sequence marking.

10. The system of claim 8, wherein the template alignment point of the first template comprises the first sequence marking.

11. The system of claim 1, wherein the laser is configured to indicate a second plurality of target points on a second surface, and further wherein each of the second plurality of target points is one of another plurality of predetermined locations uploaded to the laser, and the system further comprises:
    a second template, the second template comprising:
        a plurality of second target alignment points, wherein each second target alignment point corresponds to one of the second plurality of target points; and
        a second feature location marking;
    wherein at least a portion of the second template is adhered to the second surface after aligning each of the second target alignment points of the second template to each of the corresponding second target points indicated by the laser.

12. A system, comprising:
    a laser configured to indicate a plurality of target points on a surface, wherein each of the plurality of target points is a predetermined location uploaded to the laser;
    a first layered template comprising:
        a top-side comprising:
            a plurality of target alignment points, wherein each target alignment point corresponds to one of the plurality of target points indicated by the laser; and
        a bottom-side comprising:
            an adhesive configured to removably couple the first layered template to the surface; and
            a first reference marking that indicates a first construction feature, wherein the first reference marking is transferred from the bottom-side of the first layered template to the surface when the first layered template is removed; and
    a second layered template comprising:
        a second reference marking that indicates a second construction feature; and
        a second plurality of target alignment points, wherein each second target alignment point corresponds to one of the plurality of target points indicated by the laser;
    wherein the second layered template is removably adhered to the top-side of the first layered template.

13. The system of claim 12, wherein the first construction feature and the second construction feature are the same.

14. The system of claim 12, wherein the first reference marking of the first template is associated with a first construction trade and the second reference marking of the second template is associated with a second construction trade.

15. The system of claim 12, wherein the first layered template and the second layered template have the same dimensions and the second layered template completely overlays the first layered template.

16. A method, comprising:
    indicating, by a laser, a plurality of target points on a surface;
    aligning a plurality of target alignment points of a first template with at least a portion of the plurality of target points indicated by the laser, wherein the first template comprises a reference marking that indicates a construction feature;
    adhering the first template to the surface; and
    transferring the reference marking of the first template to the surface.

17. The method of claim 16, further comprising:
    adhering a second template to a top-side of the first template, wherein the second template comprises another reference marking.

18. The method of claim 16, further comprising:
    aligning a template alignment point of a second template with another template alignment point of the first template; and
    after adhering the first template, adhering the second template to the surface, wherein at least a portion of the second template that includes the template alignment point overlays a portion the first template that includes the other template alignment point.

19. The method of claim 18, wherein at least one of the plurality of target alignment points, the template alignment point, or the other template alignment point comprise a sequence marking.

20. The method of claim 16, wherein transferring the reference marking to the surface comprises removing the first template from the surface.

* * * * *